United States Patent
Eggena et al.

[11] Patent Number: 6,116,007
[45] Date of Patent: Sep. 12, 2000

[54] FOUR BAR LINKAGE MOUNTING FOR MOWERS

[75] Inventors: Dean A. Eggena, Crosslake, Minn.; Verne C. Watts; Charles Deyo, both of Lisbon, N. Dak.; Curtis W. Vosberg, Wyndmere, N. Dak.; Wally L. Kaczmarski, Lisbon, N. Dak.

[73] Assignee: Clark Equipment Company, Woodcliff Lake, N.J.

[21] Appl. No.: 09/033,382

[22] Filed: Mar. 2, 1998

[51] Int. Cl.[7] .................................................. A01D 34/64
[52] U.S. Cl. .............................. 56/15.1; 56/10.5; 56/11.3; 56/15.9; 56/DIG. 22; 56/15.8
[58] Field of Search .................................. 56/10.5, 10.9, 56/14.7, 14.9, 15.1, 15.8, 15.9, 11.9, 11.3, DIG. 10, 320.1, DIG. 22

[56] References Cited

U.S. PATENT DOCUMENTS

| | | | |
|---|---|---|---|
| 2,505,879 | 5/1950 | Blydenburgh | 56/26 |
| 3,857,225 | 12/1974 | Knudson | 56/13.6 |
| 3,995,411 | 12/1976 | Johnson | 56/15.8 |
| 4,175,765 | 11/1979 | Murphy | 280/460 A |
| 4,313,295 | 2/1982 | Hansen et al. | 56/15.8 |
| 4,563,019 | 1/1986 | Kuhn et al. | 280/481 |
| 4,697,404 | 10/1987 | Brockmeier et al. | 56/6 |
| 4,779,406 | 10/1988 | Schroeder | 56/15.9 |
| 4,993,216 | 2/1991 | Covington et al. | 56/15.9 |
| 5,079,907 | 1/1992 | Sameshima et al. | 56/15.9 |
| 5,280,695 | 1/1994 | Nunes, Jr. et al. | 56/6 |
| 5,433,066 | 7/1995 | Wenzel et al. | 56/14.7 |
| 5,435,117 | 7/1995 | Eggena | 56/10.2 |
| 5,666,794 | 9/1997 | Vought et al. | . |
| 5,706,638 | 1/1998 | Kinder et al. | . |
| 5,761,894 | 6/1998 | Evans | 56/320.1 |

*Primary Examiner*—H. Shackelford
*Attorney, Agent, or Firm*—Westman, Champlin & Kelly, P.A.

[57] ABSTRACT

A rotary mower is mounted onto a skid steer loader through a four bar linkage on each side of a mower housing. The linkage is arranged to pivot relative to a mounting bracket on the skid steer loader and relative to a mower housing, with differential lengths between upper and lower sets of links of the four bar linkage. The upper link on each side of the mower is slidably connected to the mower housing to permit the mower housing to pivot a limited amount about a traverse axis during normal operation. The links include stop members that engage when the mower is raised a selected amount to stop relative movement between the links and also to shut off power to the motor driving the mower. The forward end of the housing has depending chains mounted with a channel and providing a shield.

14 Claims, 7 Drawing Sheets

FIG. I

FOUR BAR LINKAGE MOUNTING FOR MOWERS

BACKGROUND OF THE INVENTION

The present invention relates to a four bar mounting linkage for mounting a mower housing to a prime mover, such as a skid steer loader. The linkage controls pivoting of the mower housing about horizontal axes, and transfers weight to the prime mover as the mower housing pivots, as well as providing for automatic shut off of a motor driving mower cutter blades when the front of the housing tilts up a certain number of degrees or is raised a selected distance.

In the prior art, U.S. Pat. No. 5,435,117 shows a rotary mower mounted onto a skid steer loader with an automatic engine cutoff. The mounting linkage is connected to the mower housing about a single horizontal pivot axis.

The present invention relates to a four bar linkage for mounting a mower of the type shown in U.S. Pat. No. 5,435,117, to include the feature of the automatic shut off when the mower is raised a predetermined distance, and also provides for a mounting that results in weight transfer and limits the amount of rearward tilting of the mower.

SUMMARY OF THE INVENTION

The present invention relates to a rotary mower that has a housing with a power unit on the housing. The mower is adapted to be mounted onto a skid steer loader, through a four bar linkage that provides for controlled up and down and side to side (roll) movement of the mower, with weight transfer to the prime mover or skid steer loader as the mower housing is lifted by the links, or when the front tilts down. In a preferred form, the linkage also permits some floating of the mower to accommodate ground irregularities by providing for limited telescoping of the upper links of the four bar linkage assembly.

The linkage controls the pivoting of the housing about a horizontal axis a selected amount, so that the mower can tilt when going over a mound or starting up a hill. The links also permit the mower to move over irregularities in the ground. When the mower tilts so the front end is raised a predetermined amount, or if the mower is raised beyond a desired height, an automatic shut off linkage will shut off the drive power to the mower.

The linkage comprises a pair of bottom links, which, as shown, have first ends pivotally mounted to an attachment bracket that mounts or lowers on the prime mover, opposite ends of the lower links are pivotally mounted to the mower housing. There are lower links on each of the opposite sides of the mower housing. Upper links have a sliding and pivoting connection to the mower housing and the opposite ends pivot to the prime mover attachment bracket. A spring is provided between the forward ends of each upper link and the pivot connection to the mower housing, which permits the front end of the mower to float downwardly on downhill inclines. The upper link stops downwardly pivoting of the front of the mower housing to prevent the front end from rolling under the support linkage.

The bracket is mounted on an attachment plate provided on the lift arms of the skid steer loader, which is pivotable about a horizontal axis using a hydraulic cylinder. The mower can be tilted down by raising the arms of the skid steer loader so that the attachment plate is raised, and then tilting the attachment plate downwardly.

The power for the mower motor, in the form disclosed, is from the hydraulic system of the skid steer loader on which the mower is mounted.

The front of the mower has depending chains that are fastened in place in a unique manner and serve as a front deflector shield.

DETAILED DESCRIPTION OF THE PREFERRED EMBODIMENTS

Figure 1:
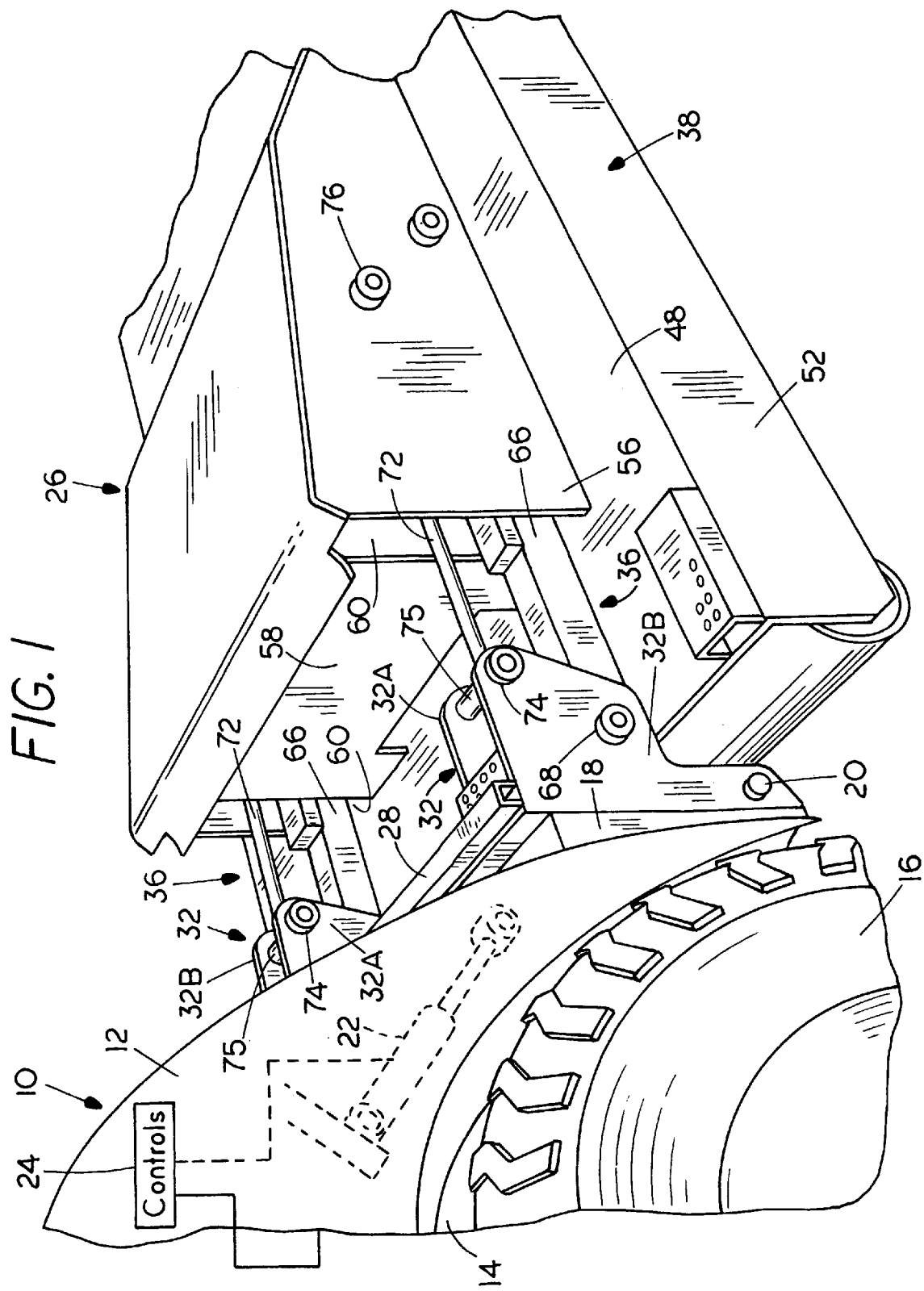
FIG. 1 is a perspective view of a mower mounted on the front of a skid steer loader using a linkage of the present invention.

A skid steer loader shown fragmentarily at 10 is a conventional loader that has lift arms 12 mounted onto a frame 14 at the rear portions of the frame (not shown). The lift arms 12 are operable to raise and lower as desired. The skid steer loader 10 has a plurality of wheels 16, and is movable over the ground. The skid steer loader 10 shown in the drawings has a front attachment plate 18 that is pivotally mounted about an axis 20 to the lower ends of the lift arms 12, and can be controlled as to its angle utilizing a hydraulic actuator shown only schematically in dotted lines at 22 from suitable controls represented at 24 which are accessible to an operator in the skid steer loader cab. The controls 24 receive hydraulic power from a pump driven from the engine of the skid steer loader, and are used to provide hydraulic power to a front mounted rotary mower indicated at 26. The rotary mower 26 has a mounting bracket 28 that attaches to the attachment plate 18 of the skid steer loader in a conventional manner. The mounting bracket 28, as shown, has a pair of spaced apart linkage mounting brackets 32, 32, each of which is comprised of two spaced plates 32A and 32B that are used for mounting a four bar linkage 36 on each side of the housing.

A mower housing 38 is mounted on the four bar linkage 36. The housing 38 has a top plate 48 that supports depending walls forming a skirt 52 on the sides of the housing 38. A rotary mower blade 42 is mounted below top plate 48 and within skirt 52. The blade 42 is driven from a vertical shaft 44 of a gear box 43 that is mounted onto top plate 48 of the mower housing. The gear box 43 in turn is driven by a hydraulic motor 50 that is controlled through a suitable valve assembly 51. The valve 51 is connected to the hydraulic system of the prime mover or skid steer loader 10 through controls 24. The valve 51 is automatically shut off by a linkage actuated when the mower tilts relative to mounting bracket or is raised a selected amount. The valve control linkage will shut off the hydraulic motor 50 and discontinue driving of the rotary blade assembly 42 as will be explained.

Figure 3:
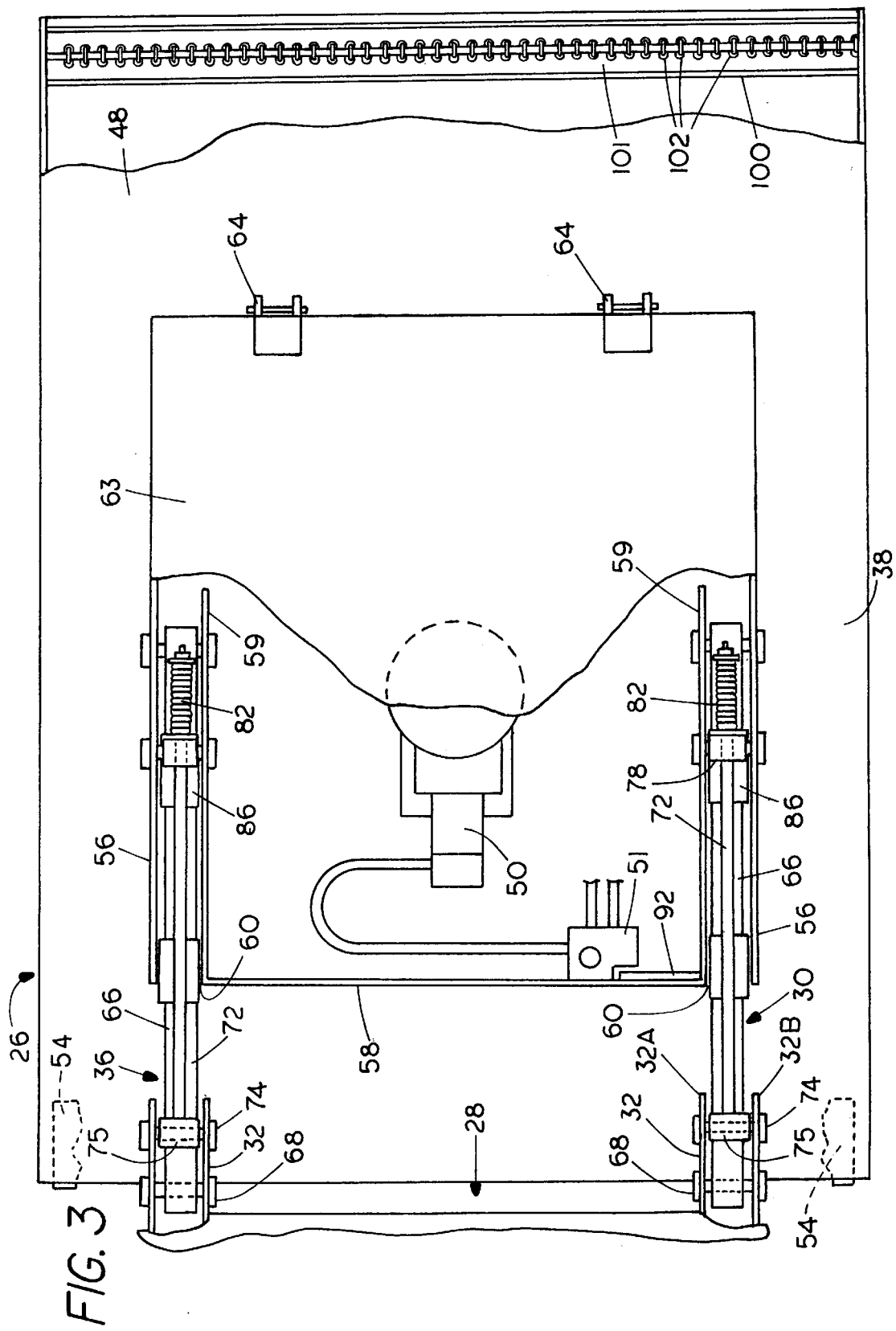
FIG. 3 is a top view taken generally along line 3—3 in FIG. 2.

The housing 38 supports a roller 54 on the side walls at the rear edge of the mower for controlling spacing relative to the ground. A linkage support frame 53 is mounted on top plate 48 and comprises a housing that has a pair of sturdy outer side plates 56, 56 that are spaced apart and are joined by a rear wall 58 adjacent the mounting bracket 28. A separate inner support wall 59 (see FIG. 3) is mounted adjacent to and spaced from each outer side wall 56 to provide a support for linkages 36 on both sides of the mower housing.

The rear wall 58 has slots 60 defined on opposite sides thereof to permit the linkages 36 to extend to the linkage support frame 53, where the link of each linkage members are pivotally attached between the side walls 56 and the respective inner support wall 59.

A cover 62 is mounted with hinges 64 to the top plate 48 of the housing 38. The cover 62 can be opened for servicing the four-bar linkage, or the hydraulic and drive components, including motor 50. The cover can be suitably latched in place.

Each four bar linkage 36, as shown, comprises a lower mounting link 66, one on each of the opposite sides of the mower housing 38, and having first ends mounted between the side plates 32A and 32B through a suitable pivot pin 68 on each of the brackets 32. The forward ends of the lower links 66 are pivotally mounted as at 70 with suitable pivot pins between the side plates 56 and the respective adjacent inner plate 59. The pivot pins used can be mounted in hubs welded to the plates 56 and 59. Suitable reinforcements can be made as desired.

Each of the linkages 36 further includes an upper link 72, on each of the opposite sides of the housing above the respective lower link 66. First ends of the upper links 72 are supported in the brackets 32 on suitable pivot pins 74. The links 72 have hub ends 75 that fit between the side plates 32A and 32B of each of the mounting brackets 32. The pivot pin 74 extend through the side plates of the respective brackets 32 in a suitable manner.

Figure 6:
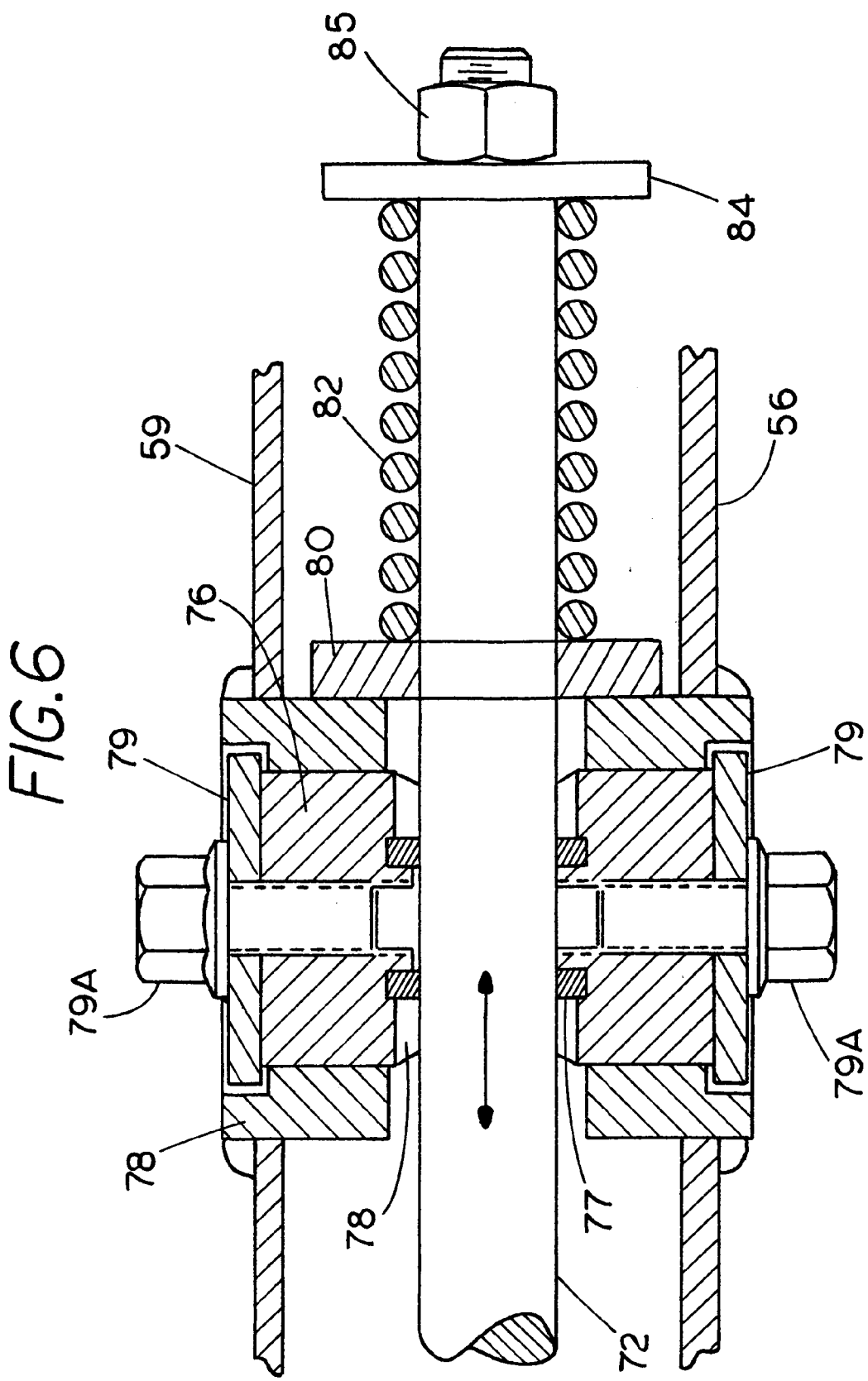
FIG. 6 is an enlarged sectional view taken generally along lines 6—6 in FIG. 4.
Figure 7:
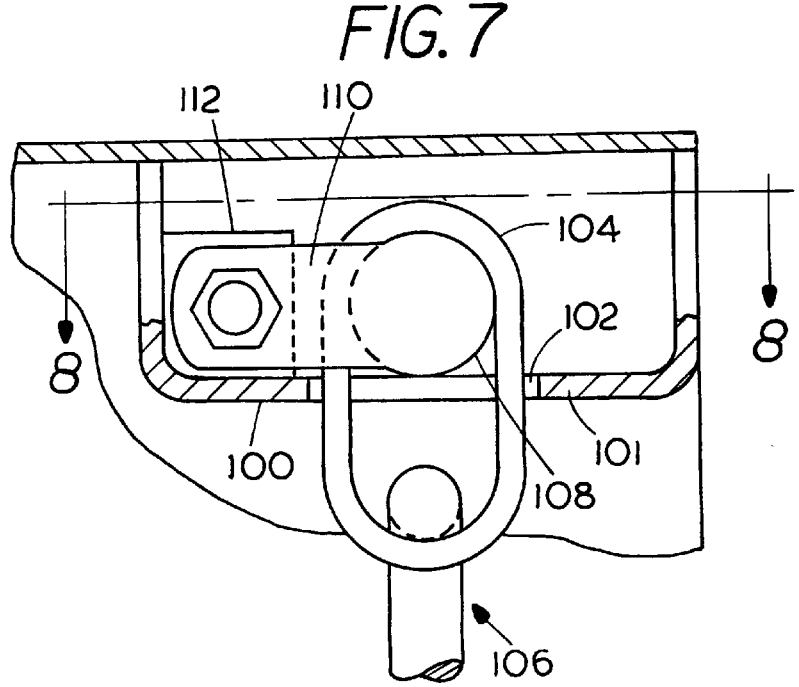
FIG. 7 is an enlarged fragmentary side view showing depending chains and a chain mounting channel on a front edge of the mower housing.
Figure 8:
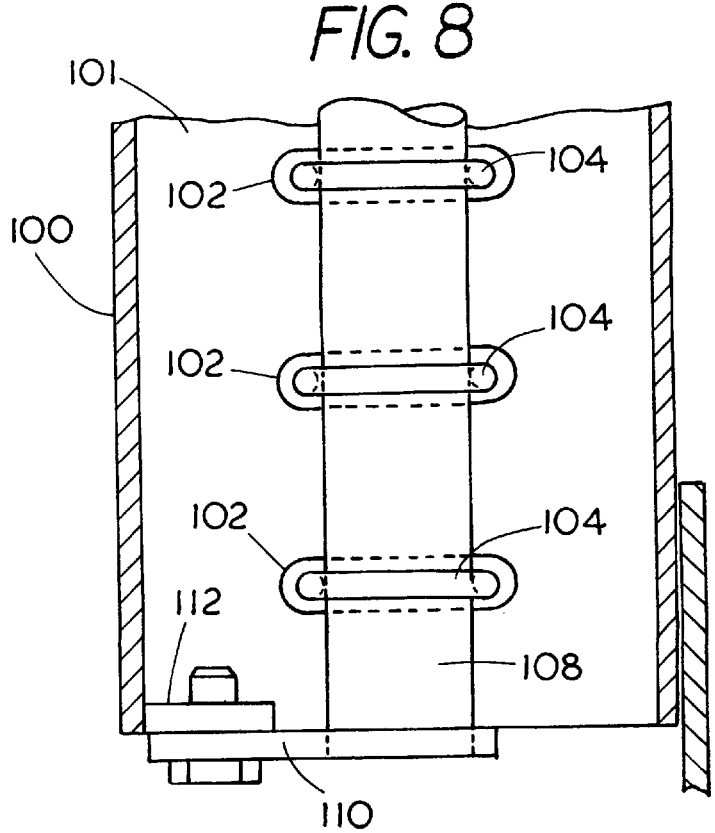
FIG. 8 is a sectional view taken on line 8—8 in FIG. 7.

The forward ends of the upper links 72 are pivotally and slidably mounted relative to the plates 56 and 59. As can be seen best in FIG. 6, a pivot bushing 76 has a support opening 78 and wiper seals 77 that slidably receive the cylindrical or circular cross section upper links or rods 72. The bushing 76 of each link is pivotally mounted in an outer support sleeve 78 that is welded to the respective plates 56 and 59. The bushing 76 can pivot about a horizontal axis. The bushing 76 is held in the sleeve 78 with washers 79 and removable capscrews 79A. The washers 79 are larger than the bushing 76 and engage recessed end surfaces of the sleeve 78 to axially position the bushing 76.

The end portion of the links or rods 72 that protrude from the bushings 76 have collars 80 at the outer side of bushings 76 that support springs 82 between the collar 80 and a washer 84 that is secured to the end of each of the links 72 with a separate nut 85. Each spring 82 will permit some compression, when the respective link slides rearwardly through its bushings 76 so the washer 80 engages the housing 78. The spring 82 will compress when the front of the mower housing 40 tends to tilt downwardly.

The lower links 66 carry stop plates 86 on the top of the links, which are aligned with the housings 78 for the bushings 76. When in the position shown in FIG. 4, the stop plates 86 will engage the housings 78 and prevent further upward movement of the lower links 66 relative to the side plates 56, causing the mower to be lifted if the lower links are raised farther, or if the front of the mower housing tilts farther upwardly.

Figure 5:
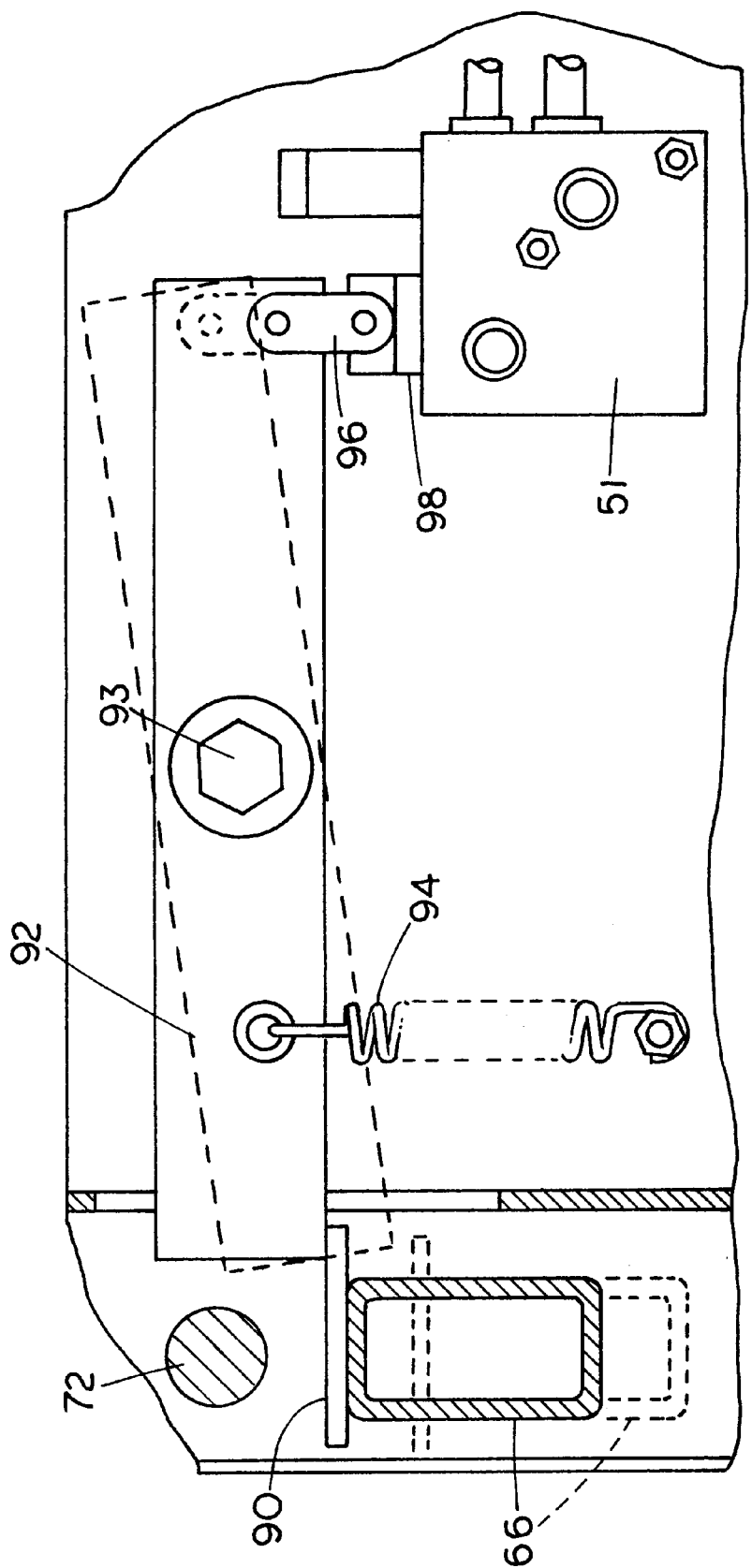
FIG. 5 is a sectional view taken generally along lines 5—5 in FIG. 4.

Additionally, at least one of the lower links 66 carries a stop plate 90 which is positioned to engage a pivoting lever 92 for shutting off the valve 51. The valve 51, as shown in FIG. 5, is carried on the inside of wall 58. The lever 92 is pivotally mounted on a pin 93 and is loaded with a spring 94 that is strong enough to move the lever 92 to its dotted position in FIG. 5 when the links 66 are in normal working position and the main power source is turned off with a valve in the operator's compartment, which provides hydraulic fluid under pressure to valve 51. This is the "on" position of the valve 51, which in turn controls flow of hydraulic fluid under pressure to drive motor 50 when the operator's valve is on. The operator can turn the mower motor off even when valve 51 is on.

When the mower housing 38 is raised by raising the loader lift arms, about to the level where roller 54 disengages the ground, the lower link 66 moves up on wall 58, and plate 90 will pivot lever 92 to its solid line position. This moves a link 96 that is connected to move the valve spool 98 to cause the valve 51 to be shut off. The valve 51 is operated by spring 94 when the mower again moves to its operating position. This provides the automatic power shut off when the mower housing is raised. If the front of the mower is tilted excessively upward the valve 51 will also be automatically shut off.

Figure 2:
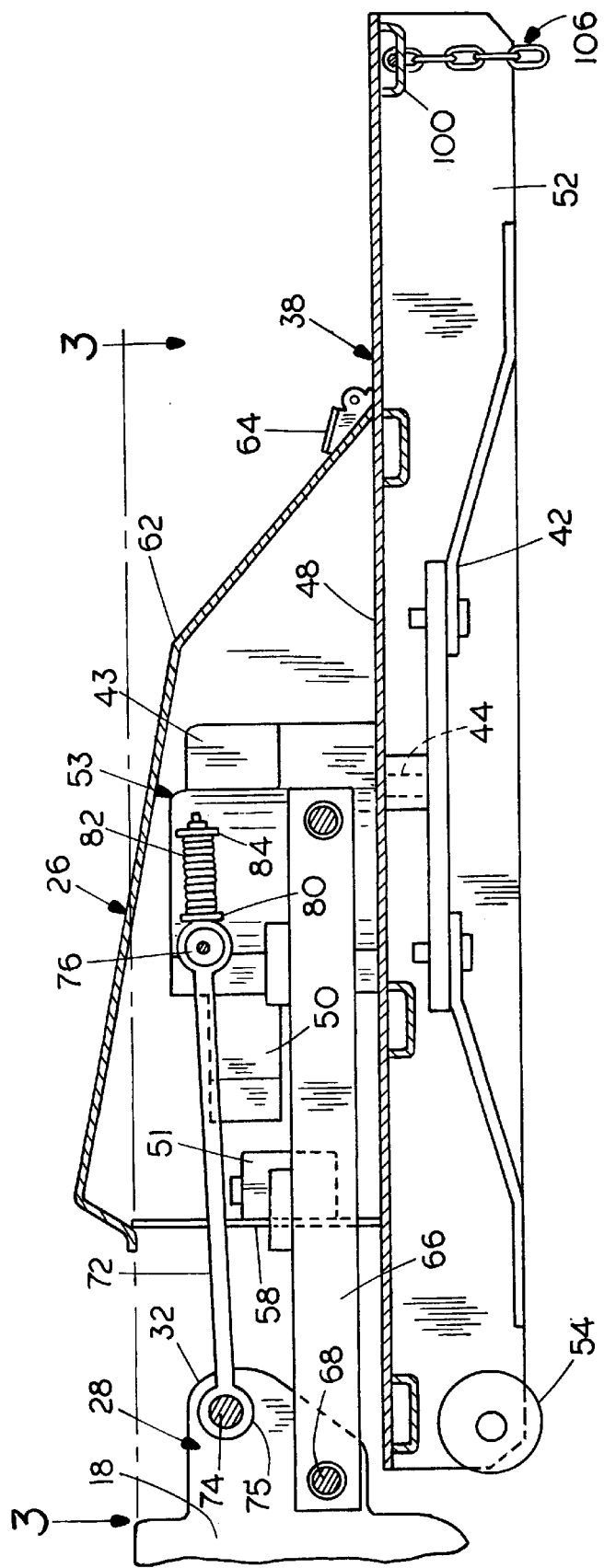
FIG. 2 is a side sectional view of a mower and mounting bracket for the linkage of the present invention.

A normal position for operating the mower is shown in FIG. 2, the lower and upper links substantially horizontal and generally parallel. The spring 82 is in position so that the mower front edge can move down as the spring 82 compresses. The mower can also tilt upwardly slightly as the links 72 slide through bushing 76. This lets the mower move across ground contours without affecting operating.

Figure 4:
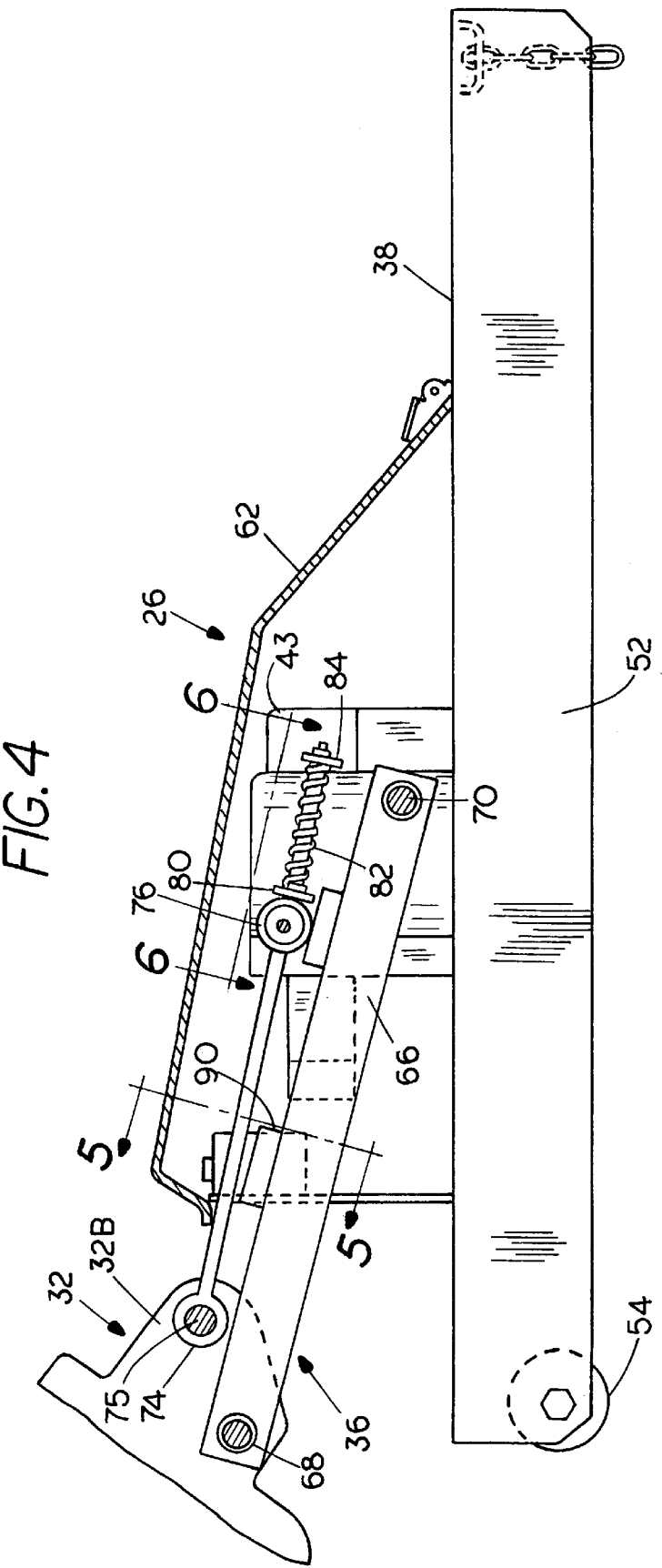
FIG. 4 is a side sectional elevational view showing a linkage in a position where the arms have operated the hydraulic motor valve to shut the motor off, and at a position where further raising of the bracket using the lift arms will cause raising of the mower.

In FIG. 4, the position that is shown is where the mower has been either tilted back or raised sufficiently, so that the lower links 66 and the upper links 72 are both pivoted, and because of the difference in lengths and the mounting locations the links, move together. In the position shown, stop plate 86 on each link 66 contacts the respective bushing housing 78 so that the front of the mower cannot move to cause links 72 and 66 to move closer together. The actuator member 90 also will engage the lever 92 and move it so that the valve 51 will be shut off and the drive motor 50 stopped.

The links 66 and 72 are not links that remain at the same spacing when the mower raises, in that the upper links 72 are shorter between its pivot points than the lower links 66, and the arrangement of the pivot points is such that the differential movement will cause the links to move together and the stop member engaging the housing 78 will cause lifting of the mower. Further, the telescoping of the links 72 in the sleeves 76 permits some fore and aft tilting (changes in pitch) of the mower during operation as described, for following contours of the ground. The mower can pivot about a fore and aft axis (roll) so one side can raise relative to the other to follow contours in the ground.

If the rear of the mower floats up or the front pitches down, the links 66 will engage the top plate 48 and movement of the front end of the mower downwardly will be stopped and load transferred to the lift arms of the loader.

The attachment bracket on the loader will also tilt about axis 20. The top of the bracket can be tilted forwardly along with raising the lift arms 12 to the position where the links are as shown in FIG. 4 with bottom edge of the mower skirt parallel to the ground. As can be seen in such position the valve will be shut off.

The amount of tilt of mounting bracket 28 is limited by hub end 75 contacting the top of link 66. This also limits how far the front of the mower can rotate upward.

The forward end of the housing 38 is provided with depending chains that will drag on the ground as seen in FIGS. 2, 4, 7 and 8, and are common in rotary type mowers. In the present device, a unique way of fastening such depending chains is shown. A channel member 100 has a horizontal lower wall 101 with a plurality of spaced, cross slots 102 formed along the length of the channel (see FIGS. 7 and 8). Slots 102 are of sufficient length and width to receive a link 104 of a multi-link depending chain 106. The chains 106 will hang down below the channel member 100. Each of the links 104 for each chain 106 is moved up from the bottom of the channel 100 through one of the openings 102, and a rod 108, is passed through the upper enclosed loop portion of each link 104 so that each link 104 is retained in the channel 100 and cannot be pulled down through the slot 102. There are preferably two rods used, one extending from each of the opposite ends of channel 100.

Each of the chains 106 is of sufficient length so that when upper end link 104 is in place in the channel 100, the lower end of the chain will be the proper length for use. The rods 108 are held in place with a suitable lock tab 110, which is welded to the end of rod 108, and extends laterally. The lock tabs are secured to tabs 112 welded at the end of the channel 100 with capscrews 114. The rod 108 can be held in place in any suitable way so that it does not move longitudinally to release the chains 106. The chains 106 are very short lengths as shown.

A three bar linkage, with a single link on either the top or bottom will work if desired.

Although the present invention has been described with reference to preferred embodiments, workers skilled in the art will recognize that changes may be made in form and detail without departing from the spirit and scope of the invention.

What is claimed is:

1. A mower comprising a mower housing with an open bottom for mowing underneath the housing, a mower blade in the housing, a motor mounted to the housing for driving the blade, the blade being rotatably driven by the motor about by a generally vertical axis, and a linkage for supporting the mower housing relative to a prime mover comprising an attachment link assembly between the prime mover and an upper side of the mower housing including a first link pivotally mounted to the mower housing at a first pivot, and adapted to be pivotally mounted on the prime mover at a second pivot and a second link adapted to be pivotally mounted on such prime mover at a third pivot spaced from the second pivot, and being mounted by a pivotal coupling to the mower housing at a fourth pivot, said first and second links being of different length between their respective pivots such that the links move closer together as the mower housing moves upwardly relative to the prime mower from a working position.

2. The mower of claim 1, wherein the pivotal coupling of said second link to the mower housing includes a sliding connection, to permit limited sliding movement of the second link through said pivotal coupling.

3. The mower of claim 2 and a spring member mounted on said second link and reacting force to said pivotal coupling when the second link slides through the pivotal coupling a sufficient amount tending to cause the length of the second link between its pivotal mounting and pivotal coupling to increase.

4. The mower of claim 1, wherein said first and second links overlie each other, and a stop member mounted on said first link in position to engage the pivotal coupling for said second link when the mower housing moves a selected amount to shift the pivotal mountings of the first and second links and move the first and second links closer together.

5. The mower of claim 1 and a motor control mounted on the mower for disabling the motor in response to changing position of the mower housing a predetermined amount from a selected position.

6. The mower of claim 5, wherein the first link has an actuator thereon, a lever for actuating the motor control, the lever aligning with the actuator and being moved to disable the motor when the first and second links move toward each other a selected amount.

7. The mower of claim 1 and an adapter bracket attachable to the prime mover, the ends of the links adapted for pivotal mounting to the prime mover being pivotally mounted on the bracket.

8. The mower of claim 1 and a plurality of chains mounted at least at a leading edge of said mower, said chains each comprising a plurality of links, a mounting member extending across the forward portion of the mower housing and having a wall with a plurality of spaced slots formed therein along the length of the wall, said slots being of size to permit an individual link of a separate one of each of the chain lengths to pass through the slot with the rest of the chain length extending from the wall, and a rod positioned on a side of the wall opposite the rest of the chain length and passing through an individual link of each chain length that extends through said slots, and a lock tab on one end of the rod for attachment to the wall for securing the rod in position and the lock tab being the sole member for securing the rod in position.

9. In combination with a prime mover and a mower mounted to the front of the prime mover, the improvement comprising a pair of four bar linkages for mounting the mower to the prime mover, the prime mover having lift arms comprising the only means of raising and lowering the mower, said linkages each having an upper link and a lower link that are independently pivotally mounted with respect to the lift arms of the prime mover at first ends thereof, and to the mower at second ends thereof, said upper and lower links being arranged to permit the mower to move about the pivotal mountings relative to a surface over which the mower is moving, and upon shifting of the mower position as guided by said links, at least one of the links striking a stop to prevent further movement of the mower in the direction of shifting, and the upper links of each four bar linkage are slidably mounted relative to the mower in direction along the axis of said upper links.

10. The combination of claim 9, wherein the mower has a motor for powering the mower, a control for the motor, and a lever for operating control, at least one of said links engaging the lever when the mower has shifted a preselected amount, to shut off the motor for the mower.

11. A rotary mower having a housing and a rotary blade within the housing powered to rotate for cutting materials, a plurality of depending chains along a forward edge of said housing, said chains each comprising a plurality of individual links, a support for the chains including a wall member, a plurality of openings spaced along the wall member across the forward edge of the mower, each of said openings being of size to receive a link from a separate one of said chains, said links having closed loop ends extending through the openings in the wall, a rod passing through the closed looped ends of the chains to hold the chains in position relative to the wall, and a lock tab attached to one end of the rod for holding the rod in a locked position extending through the closed loop ends of said links, the lock tab being the sole attachment member for holding the rod in locked position.

12. The mower of claim 11, wherein the wall is a base wall of a channel member that extends across the mower adjacent the forward end.

13. A mower in combination with a skid steer loader as a prime mover, the skid steer loader having a pair of lift arms operable to raise and lower, the mower being pivotally attached to said pair of lift arms with a pair of four bar linkages for mounting the mower to the prime mover, the lift arms being the only means of raising and lowering the mower, said linkages including a first link pivotally mounted to the mower housing at a first pivot, and adapted to be pivotally mounted on a prime mover at a second pivot and a second link adapted to be pivotally mounted on such prime mover at a third pivot spaced from the second pivot, and being mounted by a pivotal coupling to the mower housing at a fourth pivot, said first and second links being of different length between their respective pivots.

14. In combination with a prime mover, a mower mounted to the front of the prime mover, and a motor for powering the mower mounted on the mower, the improvement comprising a control for the motor, a lever for operating the control, a pair of four bar linkages for mounting the mower to the prime mover, said linkages each having an upper link and a lower link that are independently pivotally mounted with respect to the prime mover at first ends thereof, and to the mower at second ends thereof, said upper and lower links being arranged to permit the mower to move about the pivotal mountings relative to a surface over which the mower is moving, and upon shifting of the mower position as guided by said links, at least one of the links striking a stop to prevent further movement of the mower in the direction of shifting, and at least one of said links engaging the lever when the mower has shifted a preselected amount to shut off the motor for the mower.

* * * * *

UNITED STATES PATENT AND TRADEMARK OFFICE
CERTIFICATE OF CORRECTION

PATENT NO. : 6,116,007
DATED : September 12, 2000
INVENTOR(S) : Dean A. Eggena et al.

It is certified that error appears in the above-identified patent and that said Letters Patent is hereby corrected as shown below:

Column 5, line 40, cancel "by";

Column 5, line 53, cancel "mower" and insert --mover--.

Signed and Sealed this

Twenty-ninth Day of May, 2001

Attest:

NICHOLAS P. GODICI

*Attesting Officer*       *Acting Director of the United States Patent and Trademark Office*